US012148293B2

(12) United States Patent
Depeweg et al.

(10) Patent No.: US 12,148,293 B2
(45) Date of Patent: Nov. 19, 2024

(54) METHOD AND DEVICE FOR PREDICTING THE TIME REMAINING OF A SIGNAL PHASE

(71) Applicant: Yunex GmbH, Munich (DE)

(72) Inventors: Stefan Depeweg, Munich (DE); Steffen Udluft, Eichenau (DE)

(73) Assignee: Yunex GmbH, Munich (DE)

( * ) Notice: Subject to any disclaimer, the term of this patent is extended or adjusted under 35 U.S.C. 154(b) by 168 days.

(21) Appl. No.: 17/802,224

(22) PCT Filed: Feb. 4, 2021

(86) PCT No.: PCT/EP2021/052624
§ 371 (c)(1),
(2) Date: Aug. 25, 2022

(87) PCT Pub. No.: WO2021/170360
PCT Pub. Date: Sep. 2, 2021

(65) Prior Publication Data
US 2023/0080193 A1 Mar. 16, 2023

(30) Foreign Application Priority Data
Feb. 25, 2020 (DE) ..................... 10 2020 202 380.8

(51) Int. Cl.
*G08G 1/01* (2006.01)

(52) U.S. Cl.
CPC ......... *G08G 1/0116* (2013.01); *G08G 1/0129* (2013.01); *G08G 1/0141* (2013.01)

(58) Field of Classification Search
CPC ... G08G 1/0116; G08G 1/0129; G08G 1/0141
See application file for complete search history.

(56) References Cited

U.S. PATENT DOCUMENTS

2018/0157975 A1 6/2018 Hahn et al.
2020/0327803 A1 10/2020 Hobohm et al.

FOREIGN PATENT DOCUMENTS

DE 102013204241 A1 9/2014
DE 102017223579 A1 6/2019
(Continued)

OTHER PUBLICATIONS

Sirat J A et al: "Neural trees: a new tool for classification: Network: Computation in Neural Systems: vol. 1, No. 4", Jul. 9, 2009 (Jul. 9, 2009), XP055797581, Internet: URL:https://www.tandfonline.com/doi/abs/10.1088/0954-898X 1 4 003?journa1Code=inet20 [retrieved Apr. 21, 2021].

*Primary Examiner* — Nabil H Syed
*Assistant Examiner* — Cal J Eustaquio
(74) *Attorney, Agent, or Firm* — Laurence A. Greenberg; Werner H. Stemer; Ralph E. Locher

(57) ABSTRACT

A method for predicting a remaining time of a signal phase includes capturing traffic data and a signal phase specification distinguishing different signal phases of a traffic signal generator. The traffic data is fed as input data to an artificial neural network including first and second sub-networks and a combination network for combining output data of the two sub-networks. The artificial neural network is trained to reproduce a time still remaining until a phase change of the traffic signal generator based on the traffic data. Outputting of the output data of the first and second sub-networks is controlled in a manner complementary to one another according to the signal phase specification. Lastly, the output data of the combination network or the prediction data derived therefrom are transmitted to a transport device or to a road user as a prediction of the time remaining for influencing traffic.

9 Claims, 3 Drawing Sheets

(56) References Cited

FOREIGN PATENT DOCUMENTS

| | | | |
|---|---|---|---|
| EP | 3333823 | A1 | 6/2018 |
| EP | 3438942 | A1 | 2/2019 |
| EP | 3438946 | A2 | 2/2019 |

METHOD AND DEVICE FOR PREDICTING THE TIME REMAINING OF A SIGNAL PHASE

SPECIFICATION

Field and Background of the Invention

An increasing volume of traffic poses partly considerable challenges, in particular for cities. Accordingly, in many places, the aim is to reduce fuel consumption, emission of pollutants, noise emissions and waiting times by means of various traffic influencing measures.

The publication EP3438946A2 discloses a method in which switching times of a signaling system or times remaining before the switching system changes over are predicted by means of artificial intelligence. This information can be used to prompt road users when approaching a signaling system to adapt their speed, to initiate braking operations in good time or to avoid unnecessary acceleration operations. This often makes it possible to effectively reduce fuel consumption, emission of pollutants, noise emissions and waiting times. In order to achieve a sufficient prediction quality, however, very computing-intensive training and a large volume of training data are generally required for the artificial intelligence described.

SUMMARY OF THE INVENTION

The object of the present invention is to provide a method for influencing traffic, a traffic influencing device and a method for training said device, which allow a better prediction of the remaining time or require a smaller amount of training.

This object is achieved by a computer-implemented method for influencing traffic having the features described below, by a computer-implemented method for training a traffic influencing device having the features described below, by a traffic influencing device having the features described below, by a computer program product having the features described below and by a computer-readable, preferably non-volatile, storage medium having the features described below.

According to the invention, in order to influence traffic, traffic data relating to an environment of a traffic signal generator and a signal phase specification distinguishing various signal phases of the traffic signal generator are captured. The traffic data are supplied, as input data, to an artificial neural network comprising a first subnetwork and a second subnetwork that differs from the latter as well as a combination network for combining output data from both subnetworks. In this case, the artificial neural network is trained to reproduce a time still remaining to a phase change of the traffic signal generator on the basis of traffic data. According to the invention, output of the output data from the first subnetwork and output of the output data from the second subnetwork are controlled in a manner complementary to one another on the basis of the signal phase specification. Furthermore, output data from the combination network or prediction data derived therefrom are transmitted to a means of transport or to a road user as a prediction of the remaining time for the purpose of influencing traffic.

In order to train a traffic influencing device using an artificial neural network, traffic data relating to an environment of a traffic signal generator and a signal phase specification distinguishing various signal phases of the traffic signal generator are captured. The traffic data are supplied, as input data, to the artificial neural network comprising a first subnetwork and a second subnetwork that differs from the latter as well as a combination network for combining output data from both subnetworks. The artificial neural network is trained to reproduce a time still remaining to a phase change of the traffic signal generator on the basis of the traffic data. According to the invention, output of the output data from the first subnetwork and output of the output data from the second subnetwork are controlled in this case in a manner complementary to one another on the basis of the signal phase specification.

A traffic influencing device, a computer program product and a computer-readable, in particular non-volatile, storage medium are provided for the purpose of carrying out a method according to the invention.

The methods according to the invention and the traffic influencing device according to the invention may be realized or implemented, for example, by means of one or more processors, computers, application-specific integrated circuits (ASIC), digital signal processors (DSP) and/or so-called “field programmable gate arrays” (FPGA).

The use of various subnetworks controlled in a signal-phase-specific manner generally makes it possible to improve the quality of a prediction of the remaining time and/or to reduce a required amount of training. An improved prediction of the remaining time in turn makes it possible to reduce noise emissions, waiting times, emission of pollutants and/or traffic delays. In addition, only minor or no modifications to existing traffic systems are needed in many cases to use the invention.

Advantageous embodiments and developments of the invention are specified in the dependent claims.

According to one advantageous embodiment of the invention, the output of the output data from the two subnetworks can be controlled on the basis of the signal phase specification in such a manner that, in a first signal phase, the first subnetwork outputs a prediction value and the second subnetwork outputs a neutral value to the combination network, and, in a second signal phase, the second subnetwork outputs a prediction value and the first subnetwork outputs a neutral value to the combination network. As a neutral value, it is possible to output, in particular, a numerical or logic zero or a very small value which, when combined with a quantified prediction value, does not change the latter or changes it only slightly.

The combination network can preferably combine output data from the first subnetwork with output data from the second subnetwork by means of a preferably numerical addition. If a neutral value is added to a quantified prediction value in this case, the latter does not change or changes only slightly. In this manner, a signal-phase-specific prediction value from the first subnetwork can be output or selected in a first signal phase and a signal-phase-specific prediction value from the second subnetwork can be output or selected in a second signal phase, in each case as the result of the addition.

According to one advantageous embodiment of the invention, a signal-generator-specific signal phase specification can be respectively captured for a plurality of traffic signal generators. On the basis of the captured signal phase specifications, the first subnetwork can output signal-generator-specific prediction values for traffic signal generators in a first signal phase and the second subnetwork can output signal-generator-specific prediction values for traffic signal generators in a second signal phase to the combination network. This makes it possible to determine and output signal-generator-specific prediction values for a plurality of or all involved traffic signal generators in a parallel manner.

Furthermore, the signal phase specification and/or other data influencing a switching behavior of the traffic signal generator can be supplied to the artificial neural network as input data, wherein the artificial neural network is trained to additionally reproduce times remaining to a respective phase change on the basis of signal phase specifications and/or other data influencing a switching behavior of the traffic signal generator. Such data influencing a switching behavior of the traffic signal generator may comprise, in particular, time specifications, date specifications, environmental data, for example relating to weather conditions, light conditions, ice or pollution, information about peak times and/or event data relating to events, approaches of vehicles with priority, accidents or other traffic events.

According to a further advantageous embodiment of the invention, on the basis of the prediction of the remaining time transmitted to the means of transport or to the road user, an automatic start/stop system, a brake, a recuperation device, an autonomous vehicle, a navigation device and/or a route planner can be controlled or a notification can be output to the road user. This makes it possible to prompt means of transport or road users to adapt their speed, to initiate braking operations in good time, to avoid unnecessary acceleration operations or to react otherwise to the expected phase change.

Furthermore, the artificial neural network can be trained to reproduce a mean value, a median, a quantile, a probable value, a minimum, a maximum and/or a statistical fluctuation range of the remaining time or a probability of a phase change in a predefined interval of time as a prediction of the remaining time. For example, the neural network can be trained to output a probability of a change to green in the next second as a prediction of the remaining time.

An exemplary embodiment of the invention is explained in more detail below on the basis of the drawing, in which, in each case in a schematic illustration is shown.

DETAILED DESCRIPTION OF THE INVENTION

Figure 1:
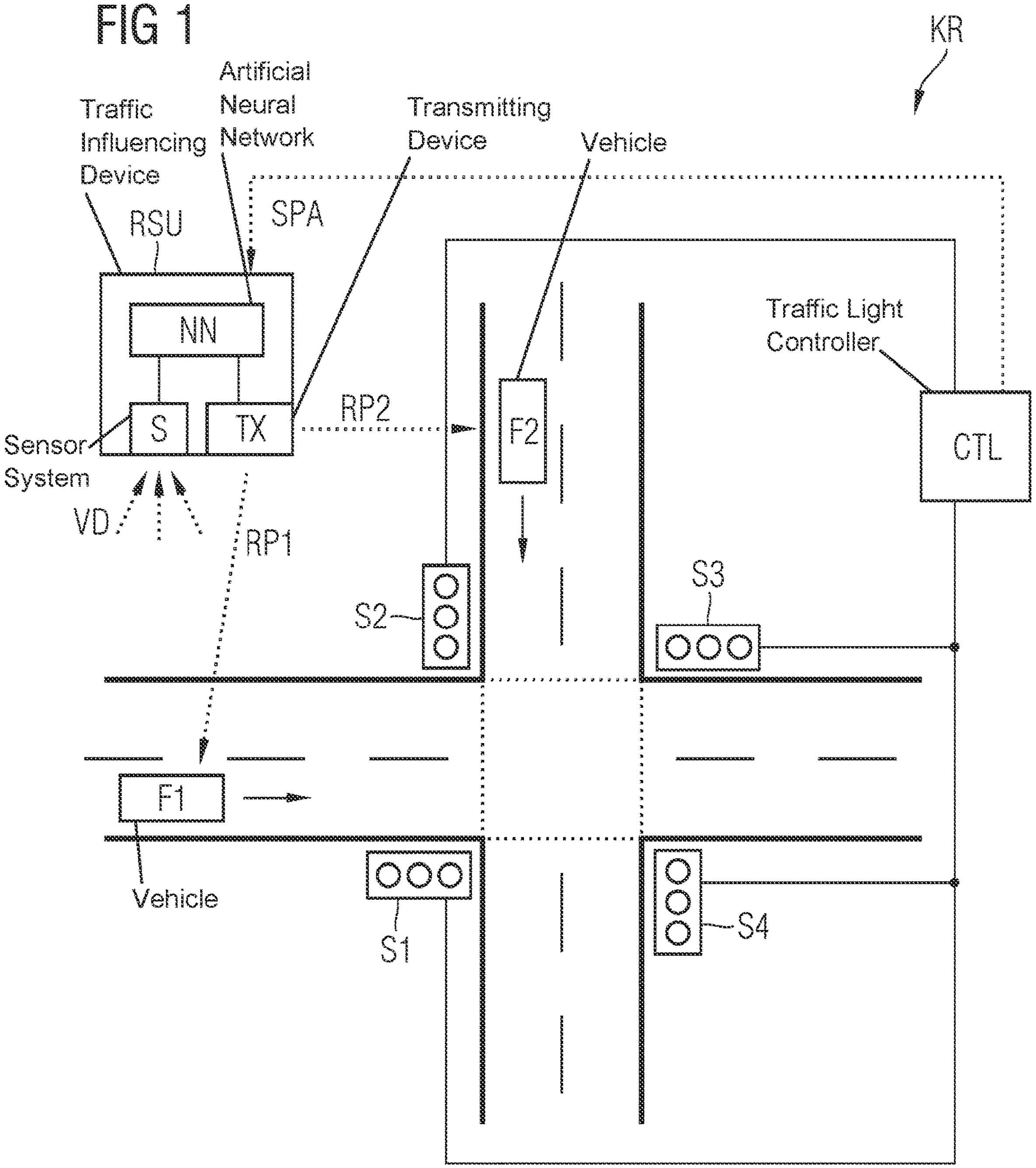
FIG. 1 shows an intersection having a traffic signaling system.

FIG. 1 shows, by way of example, a schematic illustration of an intersection KR having a traffic signaling system which comprises a plurality of traffic lights S1, . . . , S4 as traffic signal generators. In this case, traffic lights controlled in phase each form a signal group. In the present exemplary embodiment, S1 and S3 form a first signal group and S2 and S4 form a second signal group. The traffic signal generators S1, . . . , S4 are each used to control or regulate the local traffic on the basis of current traffic data or other influencing factors.

In the present exemplary embodiment, a distinction is made between two mutually complementary signal phases in a respective traffic signal generator S1, . . . or S4. That is to say, when a first signal phase is currently not available, then the second phase is, and vice versa. A first signal phase "green" can therefore be provided for unimpeded travel and a second signal phase "non-green" that is complementary thereto can be provided for blocked travel.

The traffic signal generators S1, . . . , S4 and their signal phases and phase changes are each controlled by means of a traffic light controller CTL coupled thereto. The latter may be implemented locally or as part of a cross-signaling-system traffic regulation system. The traffic signal generators S1, . . . , S4 are controlled by means of the traffic light controller CTL on the basis of locally captured traffic data or other influencing factors.

In the present exemplary embodiment, two vehicles F1 and F2 approaching the intersection KR are considered. According to the conventional traffic rules, the traffic lights of the intersection KR control which vehicle has unimpeded travel and which vehicle must wait. In the present exemplary embodiment, the traffic light S1 is relevant to the vehicle F1 and the traffic light S2 is relevant to the vehicle F2.

A traffic influencing device RSU according to the invention is also arranged in an environment of the intersection KR. The traffic influencing device is used to influence means of transport, here in particular the vehicles F1 and F2, or other road users. In this case, an internal controller of the means of transport or a smartphone belonging to cyclists or pedestrians can be influenced, in particular.

According to the invention, the traffic influencing device RSU is intended to determine a prediction of the remaining time, that is to say to predict a time still remaining to a subsequent phase change of a respective traffic signal generator. Alternatively or additionally, a probability of a phase change to green or non-green in the next second or in another predefined interval of time can also be determined as the prediction of the remaining time. On the basis of the determined predictions of the remaining time, means of transport, here F1 and F2, or other road users may be prompted when approaching the traffic signaling system to adapt their speed, to initiate braking operations in good time or to avoid unnecessary acceleration operations. For this purpose, on the basis of the prediction of the remaining time, an automatic start/stop system, a brake, a recuperation device, a navigation device or an autonomous vehicle controller in a vehicle may be controlled or a notification may be output to a road user.

In the present exemplary embodiment, signal-generator-specific or signal-group-specific predictions of the remaining time RP1 and RP2 are determined by the traffic influencing device RSU and are transmitted to the vehicles F1 and F2 in order to influence the latter. In this case, RP1 quantifies a predicted time remaining to the next phase change of the first signal group S1, S3 and RP2 quantifies a predicted time remaining to the next phase change of the second signal group S2, S4.

The traffic influencing device RSU may preferably be implemented as a so-called roadside unit. Alternatively or additionally, the traffic influencing device RSU may be completely or partially integrated in a so-called SPaT box (SPaT: Signal Phase and Timing) or coupled to the latter. The predictions of the remaining time RP1 and RP2 by the traffic influencing device RSU may be transmitted to a so-called on-board unit or to another control device in a means of transport or to a smartphone belonging to a road user. Predictions of the remaining time may also be transmitted to pedestrians or cyclists, in particular, using a smartphone.

The predictions of the remaining time RP1 and RP2 are determined on the basis of traffic data VD currently captured in an environment of the traffic signal generators S1, . . . , S4, signal phase specifications SPA and possibly other data influencing a switching behavior of the traffic signal generators S1, . . . , S4. The number and speeds of vehicles, their waiting times, approaches of vehicles with priority, traffic events such as accidents or other traffic disruptions, or further information relating to a current traffic load can be captured as traffic data VD. In order to capture or measure the traffic data, the traffic influencing device RSU has a sensor system S which may comprise, for example, vehicle sensors, cameras, speed sensors or other sensors. Alternatively or additionally, the traffic influencing device RSU may have a receiving device for data influencing the switching behavior which are captured in another manner.

The signal phase specifications SPA indicate, for a respective traffic signal generator or for a respective signal group, the current signal phase of the respective traffic signal generator or the respective signal group. Alternatively or additionally, a respective time of a last phase change can also be quantified in a signal-generator-specific or signal-group-specific manner by a respective signal phase specification. The current signal phase specifications SPA are available in the traffic light controller CTL and are transmitted from the traffic light controller CTL to the traffic influencing device RSU continuously or in the event of phase changes.

The other data influencing a switching behavior of the traffic signaling system may comprise, in particular, time specifications, date specifications, environmental data, for example relating to weather conditions, light conditions, ice or pollution, information relating to peak times and/or event data relating to events, approaches of vehicles with priority, accidents or other traffic events.

In order to determine the predictions of the remaining time RP1 and RP2, the traffic influencing device RSU has an artificial neural network NN which is coupled to the sensor system S. The neural network NN is trained to predict times remaining to a respective phase change of the traffic signal generators S1, . . . , S4 on the basis of the traffic data VD, the signal phase specifications SPA and possibly the other data influencing a switching behavior of the traffic signal generators S1, . . . , S4.

The traffic influencing device RSU also has a transmitting device TX which is coupled to the neural network NN. The transmitting device TX transmits the predictions of the remaining time RP1 and RP2, which are preferably recalculated every second, to the vehicles F1 and F2, preferably in a radio-based manner.

In addition to influencing or controlling road traffic, the invention can also be advantageously used to influence or control rail traffic, robots, shipping traffic or air traffic in order to similarly determine predictions of the remaining time for traffic signal generators, for example radio-based traffic signal generators, used there and to transmit said predictions to affected means of transport or road users.

Figure 2:
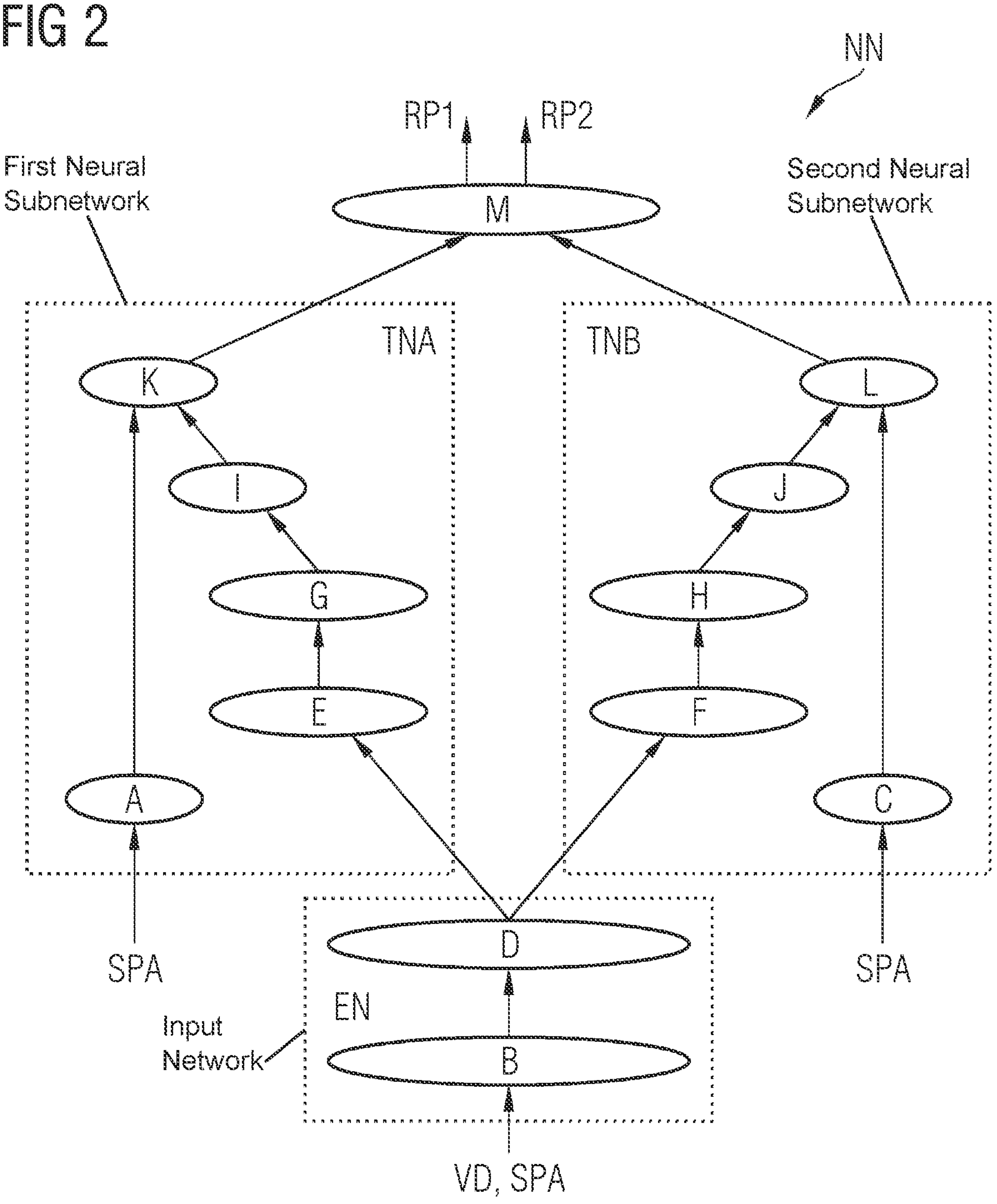
FIG. 2 shows a neural network according to the invention.

FIG. 2 illustrates a neural network NN according to the invention. Insofar as the same or corresponding reference signs as in FIG. 1 are used in FIG. 2, these reference signs denote the same or corresponding entities which can be implemented or configured, in particular, as described above.

The neural network is formed by a plurality of neural layers A to M. Data propagation between the neural layers A to M is illustrated in FIG. 2 by means of arrows.

The neural network NN comprises, in particular, two neural subnetworks TNA and TNB, wherein the first neural subnetwork TNA is formed by the layers A, E, G, I and K and the second neural subnetwork TNB is formed by the layers C, F, H, J and L. In the present exemplary embodiment, the two subnetworks TNA and TNB are separated from one another and have separated data propagation paths which are independent of one another. In particular, no neurons are shared. Alternatively, however, the subnetworks TNA and TNB may also be only partially separated, with the result that the two subnetworks TNA and TNB share individual neurons.

The neural network NN also has an input network EN. The latter is used to receive input data of the neural network NN and to preprocess said input data and to forward the preprocessed input data to both subnetworks TNA and TNB. In the present exemplary embodiment, the input network EN is formed by the input layer B and the concealed layer D. Traffic data VD, signal phase specifications SPA and other data (not illustrated) influencing a switching behavior of the traffic signal generators are supplied to the input layer B as input data. The supplied input data may be configured as described in connection with FIG. 1. The preprocessed input data, that is to say the output data from the input network EN, are supplied from the layer D to both the layer E of the first subnetwork TNA and the layer F of the second subnetwork TNB. Alternatively, it is also possible to dispense with such an input network. In this case, the input data can be directly supplied to both subnetworks TNA and TNB.

The neural network NN also comprises a combination network which, in the present exemplary embodiment, is formed by the individual layer M which simultaneously acts as the output layer of the neural network NN. The combination network M is used to combine output data from the subnetworks TNA and TNB. In the present exemplary embodiment, an output neuron of the layer M is provided for a respective signal generator or a respective signal group. Each of these signal-generator-specific or signal-group-specific output neurons outputs a quantified remaining time value, here RP1 or RP2, for a respective traffic signal generator or a respective signal group.

The layers A to M may each comprise one or more neurons. A connection between two layers in each case is indicated by means of arrows in FIG. 2. In the case of such a connection of two layers, each neuron of a starting layer may potentially be connected to each neuron of a target layer.

In the present exemplary embodiment, the subnetwork TNA with the concealed layers E, G, I and K is used for predictions of the remaining time of signal groups currently in the signal phase “green”, whereas the subnetwork TNB with the concealed layers F, H, J and L is used for predictions of the remaining time of signal groups currently in the phase “non-green”. Insofar as the same data are supplied to both subnetworks TNA and TNB by the input network EN, both the layer I and the layer J generate predictions of the remaining time for all signal groups, but only those predictions of the remaining time which are assigned to those signal groups which are currently in the signal phase “green” influence the end result in the layer I. Accordingly, only those predictions of the remaining time which are assigned to the signal groups in the signal phase “non-green” influence the end result in the layer J.

This different, more specifically complementary, consideration of the various signal phases by means of the subnetworks TNA and TNB is carried out or enforced by the layers K and L in conjunction with the layers A and C. The predictions of the remaining time from the layer I are therefore adopted from layer I by the layer K only for those signal groups which are currently in the signal phase “green”, whereas a neutral value, for example a numerical zero, is respectively entered for those signal groups which are currently in the signal phase "non-green". The information needed for this distinction is provided by the layer A. On the basis of the supplied signal phase information SPA, the layer A outputs a numerical or logic one to the layer K for all signal groups which are currently in the signal phase "green" and outputs a logic or numerical zero for those signal groups which are currently in the signal phase "non-green". In a similar manner, the predictions of the remaining time from the layer J are adopted by the layer L only for those signal groups which are currently in the phase "non-green", whereas a neutral value is entered for those signal groups which are currently in the phase "green". The information needed for this distinction is similarly provided by the layer C on the basis of the supplied signal phase information SPA.

The combination network M combines the prediction results from the layers K and L, preferably by means of simple addition, with the result that the combination network M contains the predictions of the remaining time of all signal groups irrespective of whether a respective signal group is currently in the signal phase "green" or "non-green". In the present exemplary embodiment, the combination network M outputs a prediction of the remaining time RP1 for the signal group consisting of the traffic lights S1 and S3 and a prediction of the remaining time RP2 for the signal group consisting of the traffic lights S2 and S4 as output data from the neural network NN.

Insofar as only predictions from the subnetwork TNA are taken into account for "green" and only predictions from the subnetwork TNB are taken into account for "non-green" when training the entire neural network NN on account of the mutually complementary control of the layers K and L, the normal learning process of the neural network NN has the effect of the subnetwork TNA being specifically optimized for predictions of the remaining time for the green phase and the subnetwork TNB being specifically optimized for predictions of the remaining time for the non-green phase.

Figure 3:
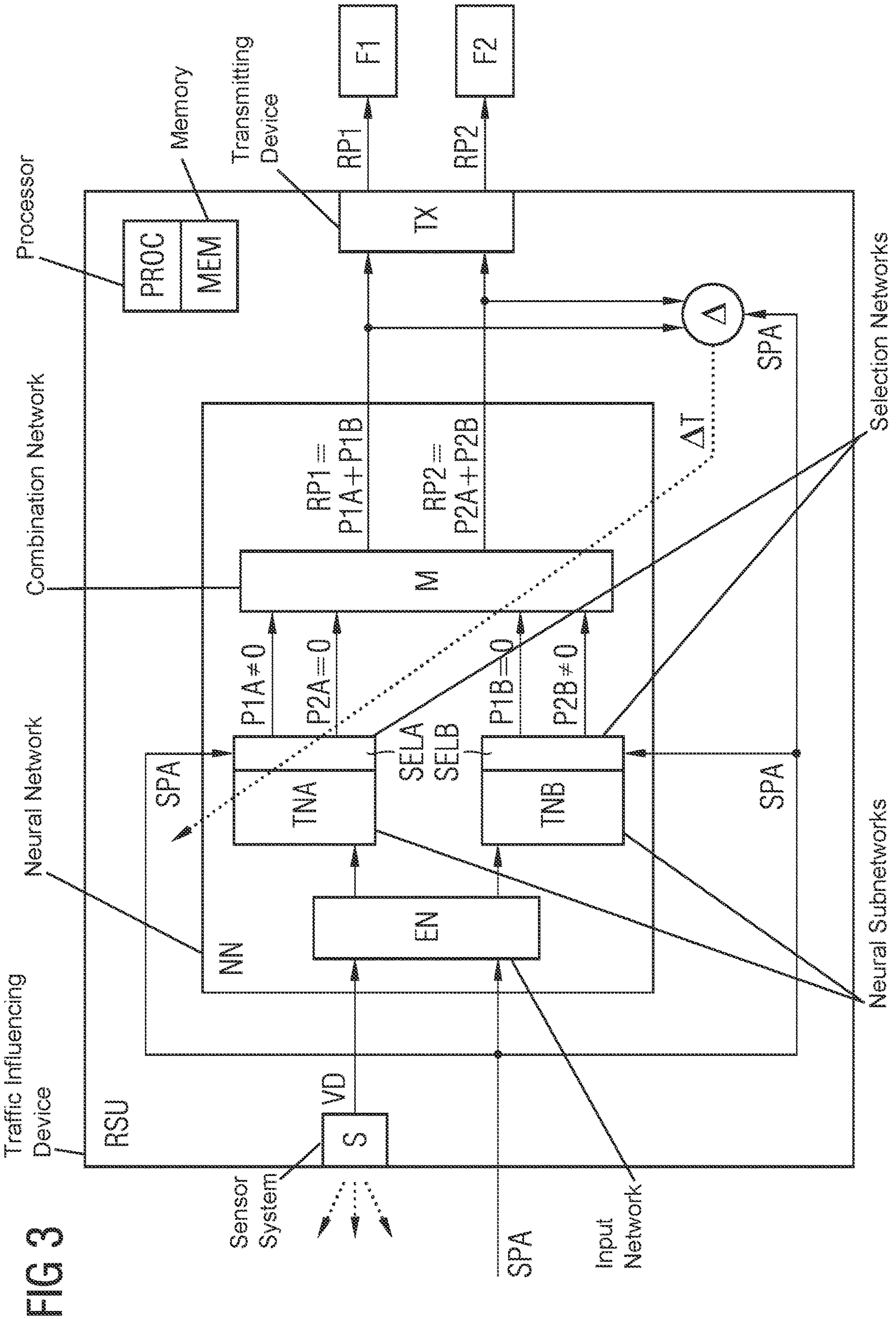
FIG. 3 shows a traffic influencing device according to the invention.

FIG. 3 shows a schematic illustration of a learning-based traffic influencing device RSU according to the invention. Insofar as the same or corresponding reference signs as in the preceding figures are used in FIG. 3, these reference signs denote the same or corresponding entities which may be implemented or configured, in particular, as described above.

The traffic influencing device RSU has a processor PROC for carrying out the methods according to the invention as well as a memory MEM which is coupled to the processor PROC and is intended to store data which arise when carrying out the methods.

The traffic influencing device RSU also has a sensor system S. In the present exemplary embodiment, the sensor system S is used to measure or otherwise capture traffic data VD or other data influencing a switching behavior of a traffic signaling system. For reasons of clarity, the latter are interpreted below as traffic data and are attributed to the traffic data VD.

The traffic influencing device RSU also has an artificial neural network NN which is coupled to the sensor system S. The traffic data VD from the sensor system S and signal phase specifications SPA are supplied to the neural network NN as input data. In the present exemplary embodiment, the neural network NN is intended to be trained to determine signal-group-specific and signal-phase-specific predictions of the remaining time, here RP1 and RP2, for all signal groups on the basis of the supplied traffic data VD and signals phase specifications SPA and to output said predictions as output data.

The traffic influencing device RSU also comprises a transmitting device TX which is coupled to the neural network NN and is intended to transmit determined predictions of the remaining time, here RP1 and RP2, to means of transport, here vehicles F1 and F2, and/or to other road users, preferably in a radio-based manner.

As already explained above, the neural network NN has an input network EN, neural subnetworks TNA and TNB and a combination network M. The traffic data VD and the signal phase specifications SPA are supplied to the input network EN as input data. The input network EN preprocesses the input data VD and SPA and transmits the preprocessed input data to both neural subnetworks TNA and TNB.

By virtue of the fact that the neural network NN is trained as a whole, the subnetworks TNA and TNB are intended to be implicitly trained as it were to determine signal-phase-specific prediction values each quantifying a time remaining to the next phase change. In the present exemplary embodiment, the subnetwork TNA outputs prediction values P1A and P2A and the subnetwork TNB outputs prediction values P1B and P2B as output data. The prediction values P1A, P2A, P1B and P2B are each selected and output in a signal-phase-specific manner by the subnetworks TNA and TNB. In order to select the prediction values, the subnetwork TNA has a selection network SELA and the subnetwork TNB has a selection network SELB. In this case, the selection network SELA may comprise the layers K and A described in FIG. 2 and the selection network SELB may comprise the layers L and C.

The signal phase specifications SPA are each supplied to the selection networks SELA and SELB in order to select and output the prediction values P1A, P2A, P1B and P2B in a signal-phase-specific manner on the basis thereof. In the present exemplary embodiment, the selection network SELA respectively outputs the green-phase-specific prediction value P1A quantifying a remaining time from the subnetwork TNA for all signal groups in the green phase according to the signal phase specifications SPA. In contrast, for all signal groups which are in the non-green phase, the selection network SELA respectively outputs a numerical zero as the prediction value P2A specific to the non-green phase. In a similar manner, the selection network SELB respectively outputs the prediction value P2B which is specific to the non-green phase and quantifies a remaining time from the subnetwork TNB for all signal groups which are in the non-green phase according to the signal phase specifications SPA. Accordingly, the selection network SELB respectively outputs a numerical zero as the green-phase-specific prediction value P1B for all signal groups which are in the green phase.

The output data from the subnetworks TNA and TNB are therefore set to zero in a manner complementary to one another by the selection networks SELA and SELB on the basis of the signal phase specifications SPA in a signal-phase-specific manner. That is to say, a quantified prediction value is output by the subnetwork TNA in the green phase of a respective signal group and—in a manner complementary to this—a prediction value from the subnetwork TNB is suppressed as it were. Similarly, in the non-green phase, a quantified prediction value from the subnetwork TNB is output and—in a manner complementary to this—a prediction value from the subnetwork TNA is suppressed as it were.

The prediction values P1A, P2A, P1B and P2B are output by the subnetworks TNA and TNB to the combination network M, wherein a quantified prediction value, either from the subnetwork TNA or from the subnetwork TNB, is respectively forwarded to the combination network M in each signal phase for all signal groups. The respective other subnetwork respectively outputs a zero. As already mentioned above, the combination network M is used to combine output data from the subnetworks TNA and TNB and to output the predictions of the remaining time, here RP1 and RP2.

The combination network M adds the prediction values P1A and P2A from the subnetwork TNA to the prediction values P1B and P2B from the subnetwork TNB in a signal-phase-specific and signal-group-specific manner. That is to say, the prediction values P1A and P1B are added for the green phase and the prediction values P2A and P2B are added for the non-green phase. A respective result is then output by the combination network M as a prediction of the remaining time RP1=P1A+P1B or as a prediction of the remaining time RP2=P2A+P2B.

Insofar as an addition of zero to a quantified prediction value does not change the latter, the complementary combination of the output data from the subnetworks TNA and TNB by the combination network M has the effect of quantified prediction values from the subnetwork TNA being output in the green phase and quantified prediction values from the subnetwork TNB being output in the non-green phase as a respective quantified prediction of the remaining time RP1 and RP2, respectively. In this manner, there is always a quantified prediction value for all signal groups.

As already mentioned above, the neural network NN is intended to be initially trained in a training phase to reproduce times remaining to the next phase change of the traffic signal generators on the basis of the input data VD and SPA supplied as training data, that is to say to output predictions of the remaining time RP1 and RP2 which are as accurate as possible.

In this case, reproduction means that a respective remaining time which is predicted on the basis of input data available until a respective time is intended to correspond as well as possible to a phase change which actually occurs later.

Training is generally understood as meaning optimization of a mapping of input data, here VD and SPA, of a parameterized system model, here the neural network NN, to output data, here the predictions of the remaining time RP1 and RP2. This mapping is optimized during a training phase according to predefined or learned criteria or criteria to be learned. Minimization of a prediction error can be used as a criterion in prediction models. The training makes it possible to set or optimize, for example, a networking structure of neurons of the neural network NN and/or weights of connections between the neurons in such a manner that the predefined criteria are satisfied as well as possible. The training can therefore be interpreted as an optimization problem for which a multiplicity of efficient optimization methods are available. The parameters optimized in this manner, in particular the optimized connection weights between neurons, can be stored as a training structure, output or transmitted to another neural network in order to configure the latter in an optimized manner.

In the present exemplary embodiment, in order to train the neural network NN, its output data RP1 and RP2 are compared with times of phase changes which actually occur later, and time discrepancies Δt between predicted phase changes and actually occurring phase changes are determined. In this case, the time discrepancies Δt may be formed by an absolute value or a square of a respective time difference. The times of the actual occurring phase changes may be determined on the basis of the signal phase specifications SPA. The time discrepancies Δt represent a prediction error of the neural network NN and are fed back to the latter. On the basis of the time discrepancy Δt which has been fed back, the neural network NN—as indicated by a dotted arrow in FIG. 3—is trained to minimize the time discrepancies Δt on average. As a result of this training, the neural network NN is able to determine relatively accurate predictions of expected times remaining to the next respective phase change.

Alternatively or additionally, the training may also be carried out completely or partially in a cloud or by another external computer. In this case, the training data, here VD and SPA, are transmitted there in order to train an external neural network according to the invention, as described above. The training structure of the trained external neural network that is obtained in this manner can then be transmitted from the external neural network to the traffic influencing device RSU in order to assign this training structure to its neural network NN. In this manner, the external neural network is copied as it were from the external computer to this traffic influencing device RSU.

The signal-phase-specific selection of the prediction values from the subnetworks TNA and TNB generally means that changes in the parameterization of the respective subnetwork TNA or TNB for predicting non-green phases and green phases do not affect the output of the neural network NN and are therefore not optimized during training either. In particular, the training of the subnetwork TNA is not disrupted by data relating to the non-green phase and the training of the subnetwork TNB is not disrupted by data relating to the green phase. This separation of the training paths is advantageous since the learning tasks in the different signal phases generally differ considerably from one another. The red phase in many traffic signaling systems is therefore subjected to substantially fixed-time control and therefore varies only relatively slightly, whereas the green phase is often controlled on the basis of the traffic and therefore in a variable manner.

The training paths in the neural network NN are switched on and off or are changed over between the subnetworks TNA and TNB in signal phases as it were. The normal learning process of the neural network NN then ensures the signal-phase-specific learning of the subnetworks TNA and TNB. It is evident that the neural network NN described in many cases provides considerably better predictions of the remaining time or requires a considerably smaller amount of training than conventional neural networks used for predictions of the remaining time.

After completing a training phase, the trained neural network NN can be used to influence traffic. For this purpose, as already described above, current traffic data VD are captured by the sensor system S and are passed to the trained neural network NN together with current signal phase specifications SPA coming from the traffic light controller CTL. As described above, the trained neural network NN uses them to determine predictions of the remaining time RP1 and RP2 which are transmitted to the transmitting device TX and are transmitted from the latter to the means of transport F1 and F2 and to other road users. The neural network NN can preferably be trained further during ongoing operation on the basis of the currently captured traffic data VD and the signal phase specifications SPA.

The invention claimed is:

1. A computer-implemented method for influencing traffic, the method comprising:

a) capturing traffic data relating to an environment of a traffic signal generator;

b) capturing a signal phase specification distinguishing various signal phases of the traffic signal generator;

c) supplying the traffic data, as input data, to an artificial neural network including a first subnetwork and a different second subnetwork as well as a combination network for combining output data from the first and second subnetworks, using the combination network to combine the output data from the first subnetwork with the output data from the second subnetwork by addition, and training the artificial neural network to reproduce a time still remaining to a phase change of the traffic signal generator based on the traffic data;

d) controlling output of the output data from the first subnetwork and output of the output data from the second subnetwork in a manner complementary to one another based on the signal phase specification; and e) influencing traffic by transmitting output data from the combination network or prediction data derived therefrom to a transport device or to a road user as a prediction of the remaining time.

2. A computer-implemented method for influencing traffic, which further comprises;

a) capturing traffic data relating to an environment of a traffic signal generator;

b) capturing a signal phase specification distinguishing various signal phases of the traffic signal generator;

c) supplying the traffic data, as input data, to an artificial neural network including a first subnetwork and a different second subnetwork as well as a combination network for combining output data from the first and second subnetworks, and training the artificial neural network to reproduce a time still remaining to a phase change of the traffic signal generator based on the traffic data;

d) controlling output of the output data from the first subnetwork and output of the output data from the second subnetwork in a manner complementary to one another based on the signal phase specification, controlling the output of the output data from the first and second subnetworks based on the signal phase specification in such a manner that:

in a first signal phase, the first subnetwork outputs a prediction value and the second subnetwork outputs a neutral value to the combination network; and in a second signal phase, the second subnetwork outputs a prediction value and the first subnetwork outputs a neutral value to the combination network; and e) influencing traffic by transmitting output data from the combination network or prediction data derived therefrom to a transport device or to a road user as a prediction of the remaining time.

3. A computer-implemented method for influencing traffic, the method comprising:

a) capturing traffic data relating to an environment of a traffic signal generator;

b) capturing respective signal-generator-specific signal phase specifications for a plurality of traffic signal generators;

c) supplying the traffic data, as input data, to an artificial neural network including a first subnetwork and a different second subnetwork as well as a combination network for combining output data from the first and second subnetworks, and training the artificial neural network to reproduce a time still remaining to a phase change of the traffic signal generator based on the traffic data;

d) controlling output of the output data from the first subnetwork and output of the output data from the second subnetwork in a manner complementary to one another based on the signal phase specifications and more specifically by further performing the sub-steps of:

causing the first subnetwork to output signal-generator-specific prediction values for the traffic signal generators in a first signal phase; and causing the second subnetwork to output signal-generator-specific prediction values for the traffic signal generators in a second signal phase, to the combination network; and e) influencing traffic by transmitting output data from the combination network or prediction data derived therefrom to a transport device or to a road user as a prediction of the remaining time.

4. The method according to claim 1, which further comprises:

supplying at least one of the signal phase specification or other data influencing a switching behavior of the traffic signal generator to the artificial neural network as input data; and training the artificial neural network to additionally reproduce times remaining to a respective phase change based on at least one of signal phase specifications or other data influencing a switching behavior of the traffic signal generator.

5. The method according to claim 1, which further comprises, based on the prediction of the remaining time transmitted to the transport device or to the road user:

controlling at least one of an automatic start/stop system, a brake, a recuperation device, an autonomous vehicle, a navigation device or a route planner, or outputting a notification to the road user.

6. A computer-implemented method for influencing traffic, the method comprising:

a) capturing traffic data relating to an environment of a traffic signal generator;

b) capturing a signal phase specification distinguishing various signal phases of the traffic signal generator;

c) supplying the traffic data, as input data, to an input network of artificial neural network including a first subnetwork and a different second subnetwork as well as a combination network for combining output data from the first and second subnetworks, training the artificial neural network to reproduce a time still remaining to a phase change of the traffic signal generator based on the traffic data, and supplying output data from the input network to the first and second subnetworks;

d) controlling output of the output data from the first subnetwork and output of the output data from the second subnetwork in a manner complementary to one another based on the signal phase specification; and e) influencing traffic by transmitting output data from the combination network or prediction data derived therefrom to a transport device or to a road user as a prediction of the remaining time.

7. A traffic influencing device configured to carry out the method according to claim 1.

8. A non-transitory computer program product with instructions stored thereon, that when executed by a processor, carries out the method according to claim 1.

9. A non-transitory computer-readable storage medium, comprising the computer program product according to claim 8.

* * * * *